United States Patent
Wang et al.

(10) Patent No.: US 10,160,406 B2
(45) Date of Patent: Dec. 25, 2018

(54) MOBILE PLATFORM AND OPERATING METHOD THEREOF

(71) Applicant: BOE TECHNOLOGY GROUP CO., LTD., Beijing (CN)

(72) Inventors: Chongshan Wang, Beijing (CN); Huiyuan Tan, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 48 days.

(21) Appl. No.: 15/199,708

(22) Filed: Jun. 30, 2016

(65) Prior Publication Data
US 2017/0274839 A1     Sep. 28, 2017

(30) Foreign Application Priority Data
Mar. 22, 2016   (CN) .......................... 2016 1 0166452

(51) Int. Cl.
  B60R 13/07   (2006.01)
  B63B 59/10   (2006.01)
  B62D 57/024  (2006.01)

(52) U.S. Cl.
  CPC .............. B60R 13/07 (2013.01); B63B 59/10 (2013.01); B62D 57/024 (2013.01); *Y10S 180/901* (2013.01)

(58) Field of Classification Search
  CPC . B62D 57/024; B62D 53/067; Y10S 180/901; E04G 23/002; B63B 59/10; E04H 4/1654
  USPC .......................... 296/24.3, 184.1, 82, 136.01
  See application file for complete search history.

(56) References Cited

U.S. PATENT DOCUMENTS

| | | | | |
|---|---|---|---|---|
| 1,905,242 A | * | 4/1933 | Rogers | B62D 53/061 188/112 R |
| 2,101,057 A | * | 12/1937 | Buckminster Fuller | B62D 35/00 180/215 |
| 2,570,711 A | * | 10/1951 | Rempel | A63H 29/06 446/464 |
| 3,435,798 A | * | 4/1969 | Rieli | B60F 3/00 180/54.1 |
| 3,810,515 A | * | 5/1974 | Ingro | A63H 11/04 180/164 |
| 3,895,596 A | * | 7/1975 | Amour | B60F 3/0007 440/12.66 |
| 3,906,572 A | * | 9/1975 | Winn | A47L 11/4011 114/222 |

(Continued)

*Primary Examiner* — Paul N Dickson
*Assistant Examiner* — Timothy Wilhelm
(74) *Attorney, Agent, or Firm* — Nath, Goldberg & Meyer; Joshua B. Goldberg

(57) ABSTRACT

The present invention discloses a mobile platform and an operating method of the mobile platform. The mobile platform comprises: a base; a housing disposed above an upper surface of the base and forming a placement space placing a work device with the upper surface of the base; and a travel mechanism disposed below a lower surface of the base for driving the housing and the base to move, wherein the lower surface of the base is provided with a groove and a bottom of the housing is disposed outside of an edge of the base. Moreover, during movement of the mobile platform, a dripping liquid drips down along the housing when the mobile platform is in an upright state, and the dripping liquid drips into the groove when the mobile platform is in an inverted state.

9 Claims, 4 Drawing Sheets

(56) References Cited

U.S. PATENT DOCUMENTS

| | | | |
|---|---|---|---|
| 3,960,229 A * | 6/1976 | Shio | B62D 55/265 114/222 |
| 4,095,378 A * | 6/1978 | Urakami | B24C 3/062 114/222 |
| 4,505,353 A * | 3/1985 | van der Lely | B62D 49/02 180/235 |
| 5,524,907 A * | 6/1996 | Walser | B60N 3/046 277/640 |
| 5,592,998 A * | 1/1997 | Urakami | B62D 57/00 180/164 |
| 5,730,553 A * | 3/1998 | Miura | B63B 59/10 114/222 |
| 5,752,577 A * | 5/1998 | Urakami | B62D 57/00 180/164 |
| 5,819,863 A * | 10/1998 | Zollinger | B62D 63/02 180/6.5 |
| 5,852,984 A * | 12/1998 | Matsuyama | B63B 59/10 114/222 |
| 5,947,051 A * | 9/1999 | Geiger | B62D 57/00 114/222 |
| 6,007,145 A * | 12/1999 | Tezuka | B62D 25/20 296/203.01 |
| 6,237,175 B1 * | 5/2001 | Phillipson | E04H 4/1663 15/1.7 |
| 6,276,478 B1 * | 8/2001 | Hopkins | B62D 57/024 114/222 |
| 6,450,103 B2 * | 9/2002 | Svensson | B60L 13/06 104/120 |
| 6,554,241 B1 * | 4/2003 | Leshem | B62D 57/024 248/205.5 |
| 6,691,811 B2 * | 2/2004 | Bruntrup | A47L 1/02 114/222 |
| 6,842,931 B2 * | 1/2005 | Porat | E04H 4/1654 15/1.7 |
| 6,886,205 B1 * | 5/2005 | Pichon | E04H 4/1654 15/1.7 |
| 6,964,312 B2 * | 11/2005 | Maggio | B62D 49/0635 15/340.1 |
| 7,118,632 B2 * | 10/2006 | Sumonthee | E04H 4/1654 134/6 |
| 7,520,356 B2 * | 4/2009 | Sadegh | B62D 49/0621 180/127 |
| 7,677,625 B2 * | 3/2010 | Gosselin | B62D 21/14 280/785 |
| 7,748,487 B2 * | 7/2010 | Urakami | B08B 3/104 15/320 |
| 7,849,547 B2 * | 12/2010 | Erlich | E04H 4/1654 15/1.7 |
| 8,386,112 B2 * | 2/2013 | Rooney, III | B63B 59/10 114/222 |
| 8,393,421 B2 * | 3/2013 | Kornstein | B63B 59/08 180/9.1 |
| 8,522,905 B2 * | 9/2013 | Lama | B62D 57/024 180/167 |
| 8,950,540 B2 * | 2/2015 | Kissel, Jr. | B62D 21/152 180/274 |
| 9,050,888 B2 * | 6/2015 | Gettings | B25J 5/005 |
| 9,360,311 B2 * | 6/2016 | Gonzalez | G01B 21/22 |
| 9,381,952 B2 * | 7/2016 | Furusaki | B62D 21/152 |
| 9,761,851 B2 * | 9/2017 | Onodera | H01M 2/1241 |
| 2006/0059637 A1 * | 3/2006 | Fridman | E04H 4/1654 15/1.7 |
| 2007/0028405 A1 * | 2/2007 | Garti | E04H 4/1654 15/1.7 |
| 2010/0023372 A1 * | 1/2010 | Gonzalez | G06Q 10/0637 705/7.36 |
| 2012/0240966 A1 * | 9/2012 | Chen | E04G 23/002 134/115 R |
| 2016/0144936 A1 * | 5/2016 | Sim | B63B 9/00 134/6 |
| 2016/0176452 A1 * | 6/2016 | Gettings | B62D 55/0885 180/167 |

* cited by examiner

MOBILE PLATFORM AND OPERATING METHOD THEREOF

CROSS-REFERENCE TO RELATED APPLICATION

This application claims the priority of Chinese Patent Application No. 201610166452.6 filed on Mar. 22, 2016 in the Chinese Intellectual Property Office, the disclosure of which is incorporated herein in its entirety by reference.

FIELD OF THE INVENTION

The present invention relates to the field of mechanical structure protective design, and in particular relates to a mobile platform and an operating method of the mobile platform.

BACKGROUND OF THE INVENTION

Industrial wall-climbing mobile platforms can move against the wall like a gecko. Since there may be flowable liquid (e.g., lubricant and condensate water) attached to the wall, such liquid may damage work devices protected inside of the mobile platform because of the liquid flowing into the interior of the mobile platform via a contact point between the mobile platform and the wall. When mobile platform moves against the wall, it may be in an upright or inverted state, which will greatly increase a probability of liquid accumulated on the wall flowing into the interior of the platform.

FIG. 1 is a structural schematic view illustrating a mobile platform in the prior art. As shown in FIG. 1, the mobile platform comprises a housing 1, a base 2 and a travel mechanism 3, wherein the housing 1 is disposed above the base 2, and the travel mechanism 3 is disposed below a lower surface of the base 2. A placement space 4 enclosed by the housing 1 and the base 2 is used for placing a work device 5. The travel mechanism 3 drives the housing 1 and the base 2 to move. A seal ring 6 is disposed between the housing 1 and the base 2 and embedded into a gap between the housing 1 and the base 2. The seal ring 6 is an O-shaped seal ring which may have a function of sealing the gap between the housing 1 and the base 2, thereby preventing liquid from entering the placement space 4 from the gap.

FIG. 1 is a schematic view illustrating the mobile platform in an upright state, and FIG. 2 is a schematic view illustrating the mobile platform of FIG. 1 in an inverted state. As shown in FIGS. 1-2, a liquid 7 will always flow through the gap between the housing 1 and the base 2 whether the mobile platform is in an upright state or inverted state, which leads to the liquid 7 infiltrating into the interior of the mobile platform from the gap and thus causing damage of the work device 5.

SUMMARY OF THE INVENTION

The present invention has been accomplished in order to solve the above problem and it is an object thereof to provide a mobile platform that can prevent the work device from being damaged and an operating method of the mobile platform.

According to one aspect of the invention, there is provided a mobile platform, comprising:
a base,
a housing disposed above an upper surface of the base and forming a placement space for placing a work device with the upper surface of the base; and
a travel mechanism disposed below a lower surface of the base for driving the housing and the base to move,
wherein the lower surface of the base is provided with a groove and a bottom of the housing is disposed outside of an edge of the base, and
during movement of the mobile platform, a dripping liquid drips down along the housing when the mobile platform is in an upright state, and the dripping liquid drips into the groove when the mobile platform is in an inverted state.

The bottom of the housing may be bent outward to warp the edge of the base.

The edge of the base may be bent downward to form a baffle structure that forms the groove with the lower surface of the base.

A gap with a seal structure therein may be formed between the baffle structure and the bottom of the housing.

The seal structure may be a seal ring.

The baffle structure and the bottom of the housing may be secured by a securing structure disposed at the outside of the seal structure.

The baffle structure may be provided with a first opening, the bottom of the housing may be provided with a second opening, and the securing structure is disposed in the first and second openings to secure the baffle structure to the bottom of the housing.

The securing structure may be a bolt.

An L-shaped member including a vertical arm and a horizontal arm that is disposed right above the gap may be provided on the baffle structure.

The vertical arm and the horizontal arm may be fixedly connected.

The vertical arm and the horizontal arm may be hinged together.

According to another aspect of the invention, there is provided an operating method of a mobile platform comprising a base; a housing disposed above an upper surface of the base and forming a placement space for placing a work device with the upper surface of the base; and a travel mechanism disposed below a lower surface of the base for driving the housing and the base to move, wherein the lower surface of the base is provided with a groove and a bottom of the housing is disposed outside of an edge of the base; the operating method comprising:
placing the work device into the placement space; and
the travel mechanism driving the housing and the base to move, wherein during movement of the mobile platform, a liquid dripping on the mobile platform drips down along the housing when the mobile platform is in an upright stale, and the liquid dripping on the mobile platform drips into the groove when the mobile platform is in an inverted state.

The present invention has the following beneficial effects:
In the invention, the bottom of the housing is disposed outside of an edge of the base and the lower surface of the base forms a groove, during movement of the mobile platform, the dripping liquid drips down along the housing when the mobile platform is in an upright state, and the dripping liquid drips into the groove when the mobile platform is in an inverted state, thus solving the technical problem of liquid infiltrating into the interior of the mobile platform from the gap due to the liquid flowing through the gap between the housing and the base for a long time, thereby avoiding damage of the work device.

DETAILED DESCRIPTION OF THE EMBODIMENTS

Hereinafter, specific embodiments of the present invention will be described in detail with reference to the accompanying drawings. It should be understood that the specific embodiments as set forth herein are merely for the purpose of illustration and explanation of the disclosure and should not be constructed as a limitation thereof.

Figure 1:
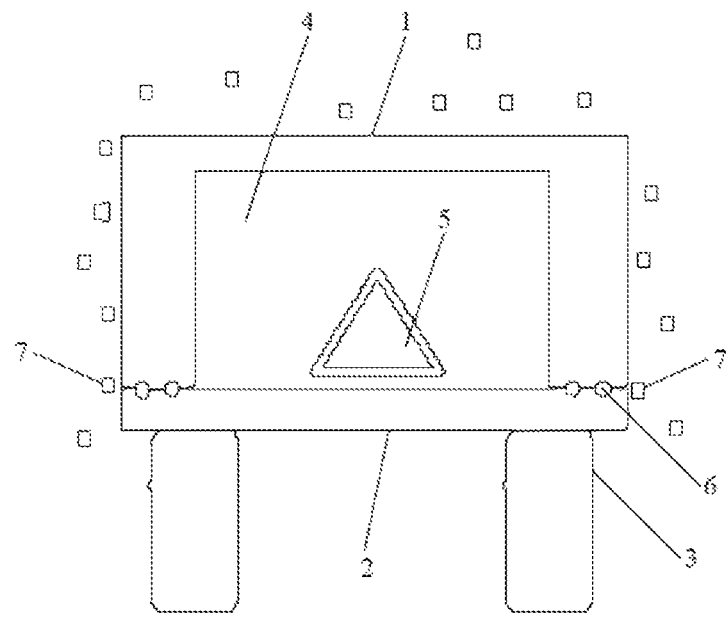
FIG. 1 is a structural schematic view illustrating a mobile platform in the prior art.
Figure 2:
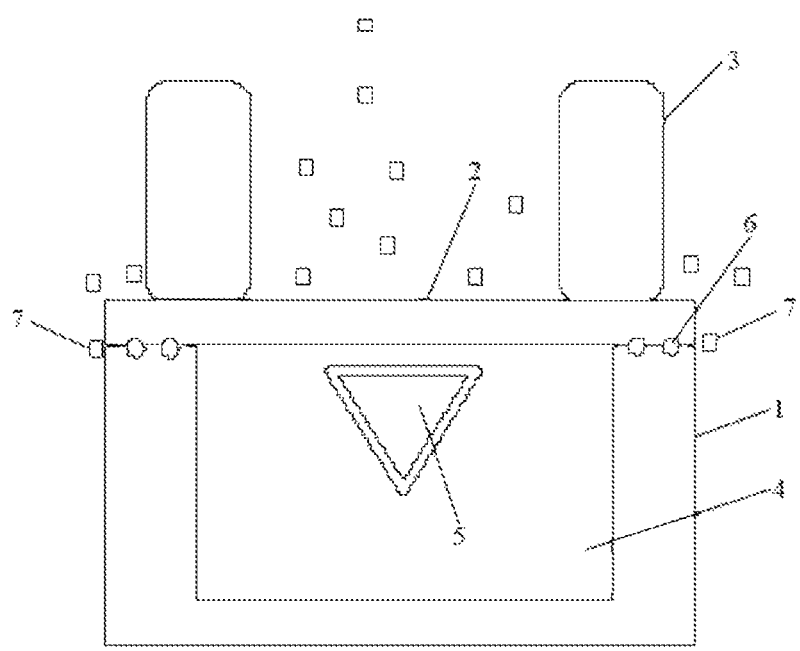
FIG. 2 is a schematic view illustrating the mobile platform of FIG. 1 in an inverted state.
Figure 3:
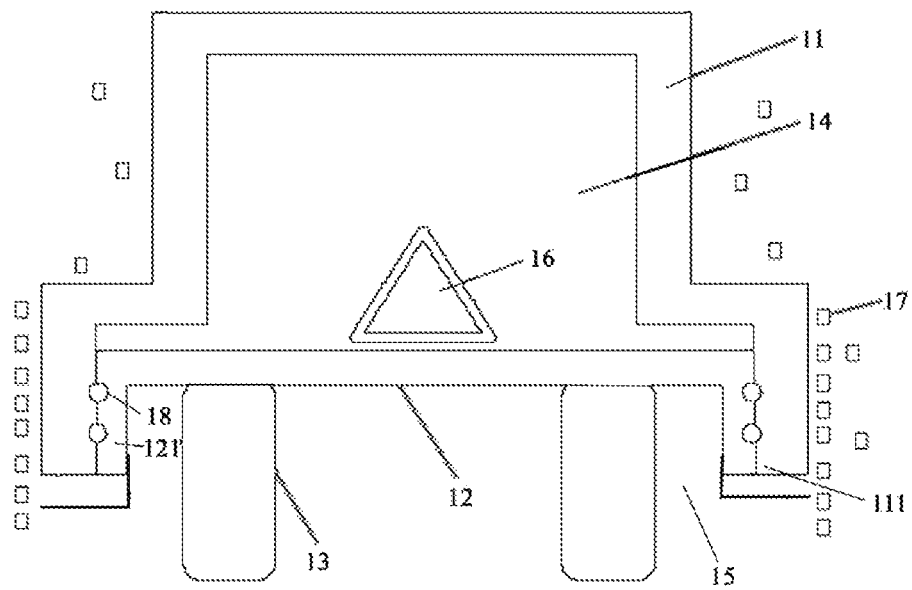
FIG. 3 is a structural schematic view illustrating a mobile platform according to the exemplary embodiment of the invention.

According to one aspect of the invention, there is provided a mobile platform. FIG. 3 is a structural schematic view illustrating a mobile platform according to the exemplary embodiment of the invention. As shown in FIG. 3, the mobile platform comprises: a base 12; a housing 11 disposed above an upper surface of the base 12 and forming a placement space 14 for placing a work device 16 with the upper surface of the base 12; and a travel mechanism 13 disposed below a lower surface of the base 12 for driving the housing 11 and the base 12 to move. The lower surface of the base 12 is provided with a groove 15 and a bottom 111 of the housing 11 is disposed outside of an edge of the base 12. During movement of the mobile platform, a dripping liquid 17 drips down along the housing 11 when the mobile platform is in an upright state, and the dripping liquid 17 drips into the groove 15 when the mobile platform is in an inverted state.

The bottom 111 of the housing 11 may be bent outward to warp the edge of the base 12. A placement space 14 that can protect the work device 16 placed therein is formed between the housing 11 and the upper surface of the base 12.

According to the exemplary embodiment of the invention, the edge of the base 12 is bent downward to form a baffle structure 121 that forms the groove 15 with the lower surface of the base 12. Preferably, the whole edge of the base 12 is bent downward to form the baffle structure 121 that encloses an edge of the whole lower surface to form the groove 15.

Preferably, the travel mechanism 13 is a plurality of roller wheels. In practical application, the travel mechanism 13 may also be other mechanisms, which will not be listed one by one here.

Preferably, the work device 16 is a control device.

A gap with a seal structure 18 therein is formed between the baffle structure 121 and the bottom 111 of the housing 11. In the exemplary embodiment of the invention, the seal structure 18 is a seal ring. Preferably, the seal ring is an O-shaped seal ring. The seal structure 18 may have a function of sealing the gap between the housing 11 and the base 12, thereby effectively preventing the liquid 17 from entering the placement space 14 inside of the mobile platform from the gap.

The baffle structure 121 and bottom 111 of the housing 11 are secured by a securing structure disposed at the outside of the seal structure 18. Wherein the outside of the seal structure 18 means a side of the seal structure 18 that is away from the lower surface of the base 12. In the exemplary embodiment of the invention, the baffle structure 121 is provided with a first opening, the bottom 111 of the housing 11 is provided with a second opening, and the securing structure is disposed in the first and second openings to secure the baffle structure 121 to the bottom 111 of the housing 11. Preferably, the securing structure is a bolt. It should be noted that the securing structure, the first and second openings are not specifically shown in the figures. In the embodiment, by securing the housing 11 and the base 12 with the securing structure, the seal structure 18 may be tightly pressed into the gap, which further improves the sealing between the housing 11 and the base 12, and thus further prevents the liquid 17 from entering the placement space 14 inside of the mobile platform from the gap.

Preferably, an L-shaped member 19 including a vertical arm 191 and a horizontal arm 192 that is disposed right above the gap is provided on the baffle structure 121, so that when the mobile platform is in an inverted state, the liquid 17 is prevented from dripping into the gap directly. In the exemplary embodiment of the invention, the vertical arm 191 and the horizontal arm 192 may be fixedly connected so that the horizontal arm 192 is stably supported by the vertical arm 191, or, in order to facilitate assembly of various components of the mobile platform, the vertical arm 191 and the horizontal arm 192 may be hinged together so that the horizontal arm 192 is rotatable around the vertical arm 191 as required. Preferably, an angle between the vertical arm 191 and the horizontal arm 192 may be at any degree from 0° to 180°, such as 60°, 90° or 120°, so as to provide better shielding for the gap.

Figure 5:
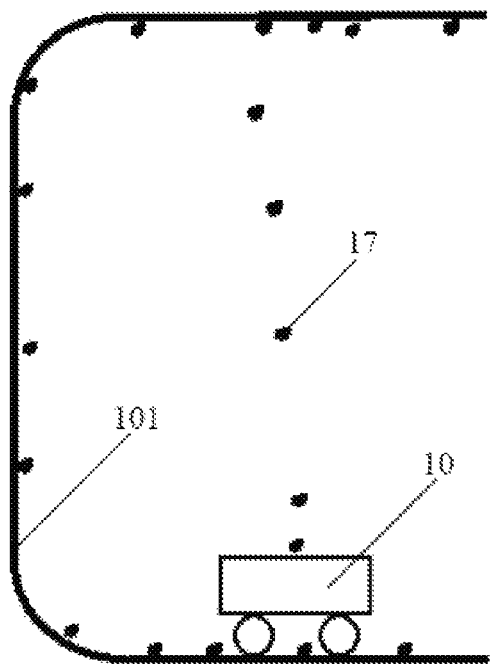
FIG. 5 is a schematic view illustrating the mobile platform of FIG. 3 climbing a wall in an upright state.

FIG. 3 is a schematic view illustrating the mobile platform in an upright state; and FIG. 5 is a schematic view illustrating the mobile platform of FIG. 3 climbing a wall in an upright state. As shown in FIGS. 3 and 5, the mobile platform is at the bottom of the wall 101. At this time, the mobile platform 10 is in an upright state and the liquid 17 dripping from above drops onto and accumulates at a top of the housing 11 before dripping down the periphery of the housing 11 along a surface of the housing 11. In this case, the liquid 17 does not flow through the gap between the housing 11 and the base 12, thereby fundamentally solving the technical problem of the liquid 17 infiltrating into the interior of the mobile platform 10 from the gap when the mobile platform 10 is in an upright state.

Figure 4:
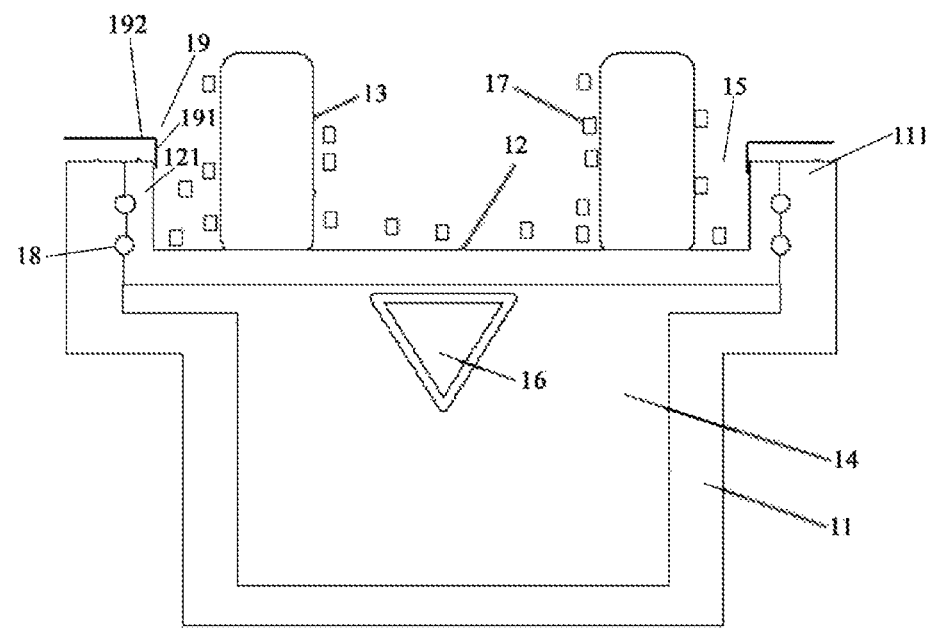
FIG. 4 is a schematic view illustrating the mobile platform of FIG. 3 in an inverted state.
Figure 6:
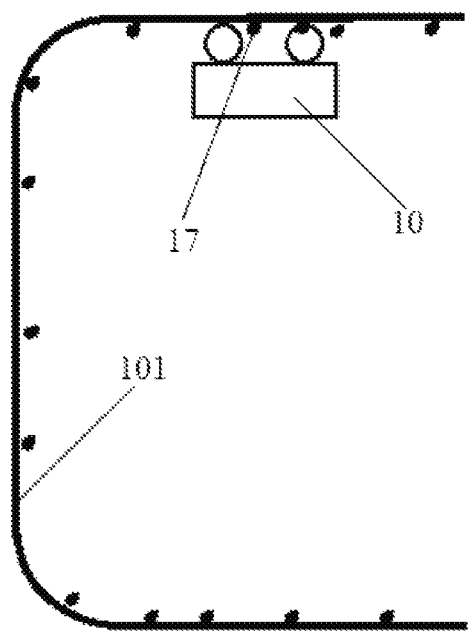
FIG. 6 is a schematic view illustrating the mobile platform of FIG. 3 climbing a wall in an inverted state.

FIG. 4 is a schematic view illustrating the mobile platform of FIG. 3 in an inverted state; and FIG. 6 is a schematic view illustrating the mobile platform of FIG. 3 climbing a wall in an inverted state. As shown in FIGS. 4 and 6, the mobile platform 10 climbs to a top of the wall 101. At this time, the mobile platform 10 is in an inverted state, and the liquid 17 dripping down from above flows into the groove 15 along the travel mechanism 13 and/or directly into the groove 15 and accumulates in the groove 15. When the mobile platform 10 moves into an upright state, the groove 15 is orientated downward and the liquid 17 accumulated in the groove 15 is poured out of the groove 15, thereby preventing the liquid 17 from infiltrating into the interior of the mobile platform 10 from the gap due to the liquid 17 flowing through the gap between the housing 11 and the base 12 for a long time.

Figure 7:
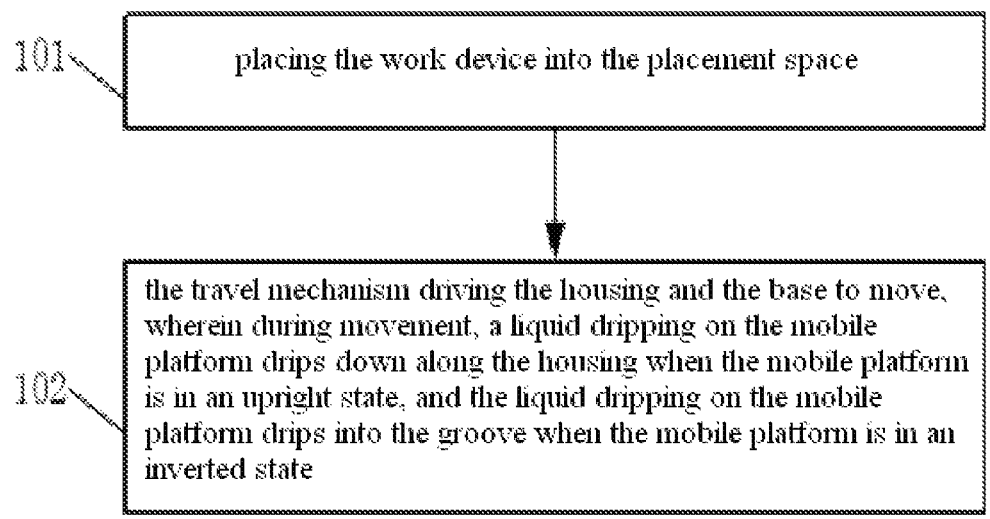
FIG. 7 is a flow chart of an operating method of a mobile platform according to the exemplary embodiment of the invention.

According to another aspect of the invention, there is provided an operating method of the mobile platform. FIG. 7 is a flow chart of an operating method of a mobile platform according to the exemplary embodiment of the invention. The mobile platform comprises a base; a housing disposed above an upper surface of the base and forming a placement space for placing a work device with the upper surface of the base; and a travel mechanism disposed below a lower surface of the base for driving the housing and the base to move, wherein the lower surface of the base is provided with a groove and a bottom of the housing is disposed outside of an edge of the base.

As shown in FIG. 7, the method comprises:

Step 101, placing the work device into the placement space; and

Step 102, the travel mechanism driving the housing and the base to move, wherein during movement of the mobile platform, a liquid dripping on the mobile platform drips down along the housing when the mobile platform is in an upright state, and the liquid dripping on the mobile platform drips into the groove when the mobile platform is in an inverted state.

The operating method of a mobile platform according the exemplary embodiment of the invention may be realized by the above discussed mobile platform 10.

It should be understood that the above embodiments are merely exemplary embodiments for the purpose of illustrating the principle of the invention, and the invention is not limited thereto. Various modifications and improvements can be made by a person having ordinary skill in the art without departing from the spirit and essence of the disclosure. Accordingly, all of the modifications and improvements also fall into the protection scope of the invention.

What is claimed is:

1. A mobile platform comprising:
   a base;
   a housing disposed above an upper surface of the base and forming a placement space for placing a work device with the upper surface of the base; and
   a travel mechanism disposed below a lower surface of the base for driving the housing and the base to move,
   wherein the lower surface of the base is provided with a groove and a bottom of the housing is disposed outside of an edge of the base,
   wherein during movement of the mobile platform, a dripping liquid drips down along the housing when the mobile platform is in an upright state, and the dripping liquid drips into the groove when the mobile platform is in an inverted state,
   wherein the edge of the base is bent downward to form a baffle structure that forms the groove with the lower surface of the base,
   wherein a gap with a seal structure therein is formed between the baffle structure and the bottom of the housing, and
   wherein an L-shaped member including a vertical arm and a horizontal arm that is disposed right above the gap is provided on the baffle structure.

2. The mobile platform according to claim 1, wherein the bottom of the housing is bent outward to warp the edge of the base.

3. The mobile platform according to claim 1, wherein the seal structure is a seal ring.

4. The mobile platform according to claim 1, wherein the baffle structure and the bottom of the housing are secured by a securing structure disposed at the outside of the seal structure.

5. The mobile platform according to claim 4, wherein the baffle structure is provided with a first opening, the bottom of the housing is provided with a second opening, and the securing structure is disposed in the first and second openings to secure the baffle structure to the bottom of the housing.

6. The mobile platform according to claim 5, wherein, the securing structure is a bolt.

7. The mobile platform according to claim 1, wherein the vertical arm and the horizontal arm are fixedly connected.

8. The mobile platform according to claim 1, wherein the vertical arm and the horizontal arm are hinged together.

9. An operating method of a mobile platform comprising a base; a housing disposed above an upper surface of the base and forming a placement space for placing a work device with the upper surface of the base; and a travel mechanism disposed below a lower surface of the base for driving the housing and the base to move, wherein the lower surface of the base is provided with a groove and a bottom of the housing is disposed outside of an edge of the base; the operating method comprising:
   placing the work device into the placement space; and
   the travel mechanism driving the housing and the base to move, wherein during movement of the mobile platform, a liquid dripping on the mobile platform drips down along the housing when the mobile platform is in an upright state, and the liquid dripping on the mobile platform drips into the groove when the mobile platform is in an inverted state,
   wherein the edge of the base is bent downward to form a baffle structure that forms the groove with the lower surface of the base,
   wherein a gap with a seal structure therein is formed between the baffle structure and the bottom of the housing, and
   wherein an L-shaped member including a vertical arm and a horizontal arm that is disposed right above the gap is provided on the baffle structure.

* * * * *